FLUID FEED LINES

Original Filed Oct. 21, 1965 2 Sheets-Sheet 1

Inventor
JOHN T. PARRETT
By Hofgren, Wegner, Allen, Stellman & McCord
Att'ys

United States Patent Office

Re. 27,224
Reissued Nov. 9, 1971

27,224
FLUID FEED LINES

John T. Parrett, Benton Harbor, Mich., assignor to Koehring Company, Milwaukee, Wis.

Original No. 3,318,199, dated May 9, 1967, Ser. No. 499,464, Oct. 21, 1965. Application for reissue Apr. 16, 1969, Ser. No. 824,008
Int. Cl. F15b *11/08;* F16l *27/12*
U.S. Cl. 91—462 8 Claims

Matter enclosed in heavy brackets [ ] appears in the original patent but forms no part of this reissue specification; matter printed in italics indicates the additions made by reissue.

*ABSTRACT OF THE DISCLOSURE*

*A reciprocable fluid feed line for conveying fluid either to or from a remote load including a first tube having a second tube telescopically received therein with a piston on the end of the inner tube, there being provided passageways through the tubes to pressurize the side of the piston tending to retract the tubes, and a vent for the side of the piston which if pressurized would tend to extend the tubes.*

This invention relates generally to a fluid or hydraulic system, and more particularly to a hydraulic system for conveying fluid to a remotely positionable motor.

One means employed in the past to convey hydraulic fluid from a source of fluid under pressure to a remotely positionable motor has been what is commonly known in the art as telescopic feed lines. These feed lines find their principal use on mobile cranes and derricks. One type of such equipment utilizes a telescopic type boom in which the boom tip may be extended or retracted axially to vary the length of the boom to match operational requirements. Oftentimes such equipment utilizes hydraulically operated tools suspended from the boom tip. To convey motive fluid from the machine base to these power operated tools it has been conventional to employ telescopic feed lines having sections fixed to the movable portions of the boom which allow the boom to be extended or retracted independently of the operation of the hydraulic tools.

Another application of telescopic feed lines in the same environment is in connection with "outrigger" cylinders, which are used to stabilize mobile equipment to prevent overturning. One method of mounting outrigger cylinders is to fasten them to the ends of horizontal telescopic type beams which allow the outrigger cylinders to be moved horizontally outwardly from the side of the equipment to secure a wider base. The outrigger cylinders are mounted vertically on the ends of the beams, and after extending the beams are operated to contact the ground and thus support the equipment.

In prior known telescopic feed lines in both of the above described applications, a rigid inner tube is provided slidable within a rigid outer tube in telescopic fashion. A severe limitation on the utility of these telescopic feed lines is that the end of the inner tube is subjected to hydraulic fluid pressure within the tubes and forms what might be termed a hydraulic actuator which tends to separate the inner tube from the outer tube. The force created by this hydraulic actuator action within the prior known feed lines tends to buckle the extending portion of the inner tube in column action. While it is theoretically possible to strengthen the inner tube to withstand this column action, this has not proved to be a desirable solution.

In accordance with the present invention, the above described disadvantages in prior known telescopic feed lines have been overcome by providing a telescopic feed line which balances or overcomes the inherent undesirable extending force in prior known feed lines so that a feed line of any length may be made without any tendency to buckle.

It is therefore a primary object of the invention to provide a new and improved telescopic feed line for delivering fluid to a remotely positionable motor which eliminates the column or axially compressive force on the extending portion of the inner tube to overcome the problem of buckling in prior known telescopic feed line constructions.

A further object of the present invention is to provide a new and improved telescopic feed line of the type described above which places a continuous tensile force on the inner tube of the telescopic feed line to prevent buckling thereof and which is adapted to be operative even when the feed line is collapsing or extending so that the remotely positionable motor may be continuously driven without interruption if desired.

A further and more specific object of the present invention is to provide a new and improved telescopic feed line in accordance with one embodiment disclosed in this specification in which the inner telescopic tube has an enlarged piston at one end thereof slidable within the outer tube and defining therein a hydraulic chamber which receives high pressure fluid from the pressure source to place the inner tube under a continuous tensile force.

A still further object of the present invention is to provide new and improved telescopic feed lines in accordance with the embodiment described generally immediately above in which the piston also defines a second chamber within the outer tube, with this chamber being connected to low pressure so that there is no compressive or column action on the inner tube of the telescopic feed line.

Still another object of the present invention is to provide a new and improved hydraulic system of the type described above employing telescopic feed lines in which two identical feed lines of the type described are provided for selectively conveying fluid to and from the motor, with a control valve for selectively connecting each of the feed lines to a source of fluid under pressure or to a drain, each of the outer tubes being provided with normally open poppet valves responsive to high pressure fluid in the respective feed lines for connecting the chambers on one side of the piston to a low pressure return passage to maintain these chambers at low pressure and prevent any compressive force on the inner tube.

A still further object of the present invention is to provide a new and improved hydraulic system of the type described immediately above particularly adapted for conveying fluid to a fluid operated tool on the end of an extendable boom, with the feed lines arranged so that they convey fluid to the tools in any extended position of the boom and even when the boom is extending or distending.

Still another object of the present invention is to provide a new and improved hydraulic circuit for supplying fluid to a remotely positionable motor through new and improved hydraulic feed lines according to another embodiment of the present invention in which the normally compressive forces on the extending end of the inner tube are eliminated or counteracted by a sleeve-like clamp surrounding the inner tube and mounted within the outer tube, actuable by hydraulic fluid from the pressure source to clamp the inner tube and prevent any tendency to extend it from the outer tube.

A more specific object of the present invention is to provide a new and improved hydraulic system for supplying fluid to remote loads where a first member carries second extensible support member with the second mem er having a motor at the distal end thereof, with a source f fluid under pressure adapted to provide hydraulic fluid or the motor, with a feed line for conveying fluid from ie source to the motor means including a first tube fixed vith respect to the first member, a second tube fixed with espect to the second member in telescopic relation with ie first tube so that upon extension of the second member ie tubes will extend, there being provided means for conecting the first tube to the source of fluid under pressure nd the second tube to deliver fluid to the motor means, iere being also provided spaced seals defining a chamber vithin the distal end of the first outer tube and engaging ie inner tube, a flexible sleeve within the chamber beween the seals and adapted to selectively clamp against ie inner tube with generally radial passage means in the uter tube extending from the chamber, axially extending assage means connected with said radial passage to a secn radial passage means in said first tube communicating vith the interior of the first tube, the first and second tubes eing spaced apart adjacent the second radial passage so iat the latter passage can communicate with high presire fluid flowing through the tubes and the sleeve memer clamps against the inner tube in response thereto.

Another object of the present invention is to provide a ew and improved hydraulic system of the type described nmediately above particularly adaptable for delivering uid to and from an outrigger cylinder at the end of an xtensible beam adapted for use in balancing mobile quipment.

Other features and advantages of the invention will be pparent from the following description of certain embodiients thereof taken in conjunction with the accompanyig drawings. Of the drawings.

Figure 2:
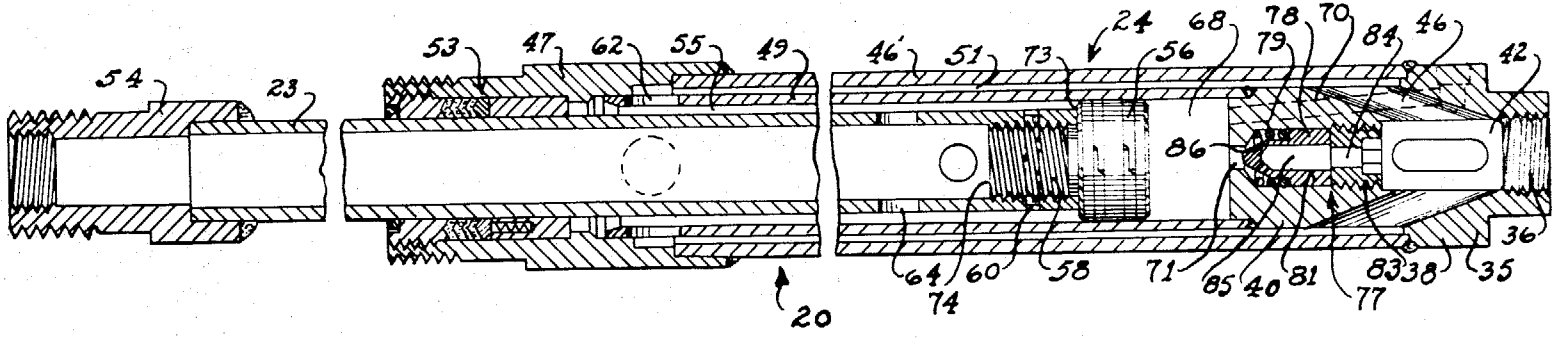
FIG. 2 is a cross section of a feed line which is particuirly suitable for use with the embodiment shown in IG. 1.
Figure 3:
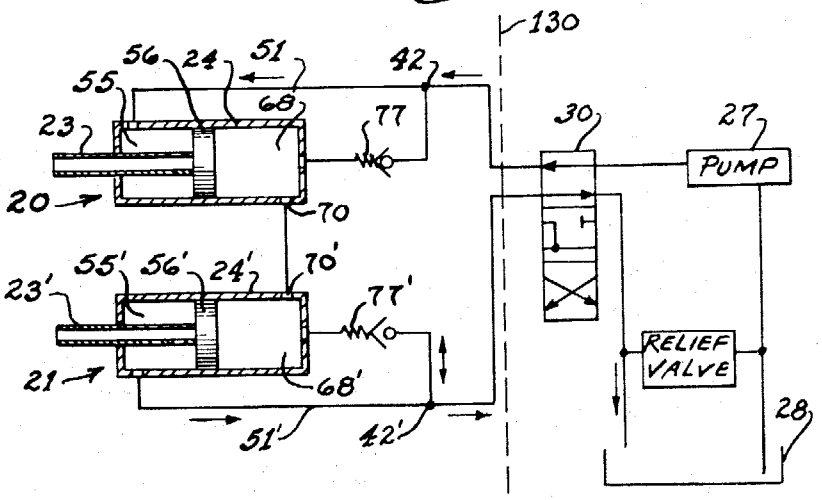
FIG. 3 is a generally schematic illustration of a hydrauc fluid circuit adapted for use in the embodiment shown i FIGS. 1 and 2.
Figure 1:
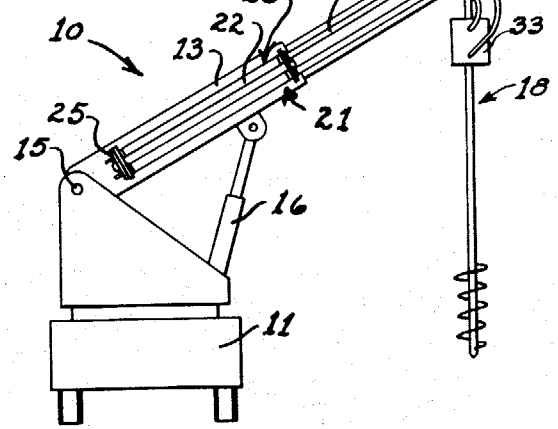
FIG. 1 is a side elevation of a mobile derrick with feed nes according to one embodiment of the present invenon for conveying fluid to a rotary fluid operated tool n the distal end of the boom.

Referring now to FIGS. 1 to 3 wherein the first embodiient of the present invention is illustrated, and particuirly to FIG. 1 thereof, a mobile derrick or crane generalr designated by the numeral 10 is seen to consist of a rame member 11 and an extensible boom including a first iember 13 and a second member 14 axially slidable with espect to member 13. Boom member 13 is pivotally conected to the frame as at 15 and the boom is raised or owered in arcuate movement by a suitably connected ydraulic actuator 16. The distal end of boom member 4 carries a fluid or hydraulically operated tool 18 which iay take the form of a rotary auger. However, it should e understood that other tools may be usable as well. It iould also be noted here that conventional means are rovided for extending boom member 14 and for fixing at a desired location with respect to member 13.

For conveying fluid under pressure to the hydraulic ool 18 and for returning fluid therefrom, hydraulic feed nes 20 and 21 are provided. These feed lines are idential in construction so that when reference herein is made o the construction of one of them it will be understood iat it applies equally well to the other. Feed lines 20 and 1 consist of an outer tube 22 fixed to boom member 13 nd an inner tube 23 fixed to boom member 14 and slidble within the outer tube 22. The lower ends 25 of each f the outer tubes 22 are adapted to be selectively conected to a source of fluid under pressure, such as pump

27 (FIG. 3) or a tank 28 through a directional control valve 30 described in more detail below. The distal ends 32 of the inner tubes 23 are hydraulically connected to the opposite sides of a motor 33 which drives the tool 18.

In this manner hydraulic fluid is supplied from a source to a remotely positionable motor 18 through the hydraulic feed lines 20 and 21, with the feed lines being collapsible and extensible so that they permit the boom members 13 and 14 to be extended as desired without interfering with the operation of the tool 18.

Referring now to FIG. 2 wherein the telescopic feed lines 20, 21 are shown in more detail, the outer tube 24 is seen to include a generally cylindrical fitting 35 having an internally threaded boss 36 adapted to be connected through a suitable hydraulic fitting to the directional control valve 30 shown in FIG. 3. Fitting 35 has an annular flange 38 and a cylindrical axially extending projection 40. A centrally disposed bore 42 extends through the fitting 35 and communicates with four circumferentially spaced angularly extending passages 46 in the fitting 35. The telescopic outer tube 24 has an outer sleeve 46' fixed at one end to the flange 35 and at the other end to fitting 47. An inner sleeve 49 is fixed at one end to cylindrical projection 40 and at the other end to fitting 47. Sleeves 46' and 49 are spaced defining an axially extending passage 51 which communicates with the passages 46 in the fitting 35.

Fitting 47 has suitable bearing and seal means generally indicated by the numeral 53 which slidably receive the inner tube 23. The outer end of the inner tube 23 carries a suitable fitting 54 adapted to be connected through flexible conduits to one of the ports in motor 33. The outer diameter of the tube 23 is less than the inner diameter of sleeve 49 so that there is defined therebetween a chamber 55 closed at one end by the seal 53 and at the other end by a solid piston 56 carried by the inner end of tube 23. Piston 56 has a projection 58 threaded within the tube 23 and locked therein by a suitable pin 60.

Communication is provided between passage 51 between the sleeve 46', 49 and the chamber 55 between the inner tube 23 and the sleeve 49 by radial ports 62 at one end of sleeve 49. To permit fluid flow from the chamber 55 to the inside of tube 23 and hence to the motor 33, radial ports 64 are provided at the inner end of tube 23. Thus, it may be seen that when high pressure fluid is delivered to bore 42 in fitting 35 it flows through ports 46 to the axial annular passage 51, hence through radial ports 62 and 64, through the inside of tube 23 to drive the motor 33 and the tool 18. Piston 56 defines within the inner sleeve 49 a second chamber 68 adapted to be placed in communication with low pressure through either passage 70 or 71 in the fitting 35 as will appear hereinafter.

It may thus be seen from the construction of the present invention described with reference to FIG. 2 that all the compressive or column forces on the inner tube 23 have been eliminated and in fact in this embodiment a continuous tensile force is applied to tube 23 by high pressure fluid in chamber 55 acting on the annular piston area 73 and the fluid in the inside tube 23 acting on surface 74 of the piston 56. All the axially compressive or collumn forces acting on tube 23 have been eliminated as will appear obvious due to the fact that chamber 68 is continuously connected to low pressure.

As described above, the feed lines 20 and 21 are adapted to either deliver fluid under high pressure to the motor 33 or to return fluid therefrom to the tank 28. Toward this end normally open poppet valves 77 are provided for permitting communication between chamber 68 and passage 42 when the latter passage is connected to the tank 28 which is of course at a relatively low pressure. Poppet valve assembly 77 consists of a movable piston-like valve member 78 slidable in fitting 35 and spring biased to its open position by a coil spring 79 seated within a bore 81 in the fitting 35. Spring 79 biases the valve member 78 against a normally stationary plug 83 which has a central opening 84 therethrough. The movable valve member 78 also has a passage 85 therein which conveys fluid from chamber 68 and restricted passages 86 when the valve is open. When high pressure fluid is admitted to passage 42 fluid will flow through passage 84 in plug 83 and into bore 85 in the movable valve member causing the valve member to close and preventing the flow of fluid under pressure to chamber 68. On the other hand, when passage 42 is connected to drain by the directional control valve 30, spring 79 will move valve member 78 to a position against the plug 83, thereby opening the valve and permitting fluid to flow from chamber 68 to chamber 42 and tank or vice versa. The manner in which passages 70 and 71 maintain chamber 68 in continuous communication with low pressure and permit the boom to be extended as desired without interrupting fluid flow to the tool will be described below with reference to FIG. 3.

In viewing FIG. 3, directional control valve 30 is a conventional four-way directional control valve as shown only schematically. For the sake of clarity the reference numerals designating telecsopic feed line 21 in FIG. 3 are the same as those of the line 20 except that they are primed to distinguish therebetween although, as noted above, both feed lines are identical in construction. With the control valve 30 in its lowermost position as shown, the hydraulic circuit is such that high pressure fluid will be delivered from pump 27 through the control valve 30, through feed line 20 to one side of the hydraulic motor 33 and from the other side of the hydraulic motor 33 through the feed line 21, through control valve 30 and to the tank 28. High pressure fluid flowing through the control valve 30 and into passage 42 closes the check valve 77. Fluid flows through passage 51 into the rod end of piston 56 and through tube 23 to the motor. At this time chamber 68 communicates with the low pressure side of the system through passage 70 which is interconnected with passage 70', chamber 68' in the feed line 21, open poppet valve 77' and port 42'. As control valve 30 places port 42' at low pressure at this time poppet valve 77' is open and permits this low pressure communication. Fluid flows from the motor 33 to the tank through rod 23', passage 51', port 42', and control valve 30. The boom may be extended or retracted at this time and it will have no effect on the operation of the hydraulic feed line circuit shown in FIG. 3. Thus, if the inner tubes 23 and 23' are moved to the right or to the left in the outer tubes 24 and 24', as shown in FIG. 3, the same hydraulic relationships will be maintained. For example, if tubes 23 and 23' were moved to the left by extending boom member 14 when feed line 20 is pressurized, fluid will flow through passage 42' and poppet 77' to both chambers 68 and 68'. At the same time the volume of chambers 55 and 55' will be reduced.

One important feature of the present construction is that for every foot of collapsed length of the tubes 23 and 24 the inner tube is permitted to extend a substantially equal length from the outer tube. This permits the use of a smaller collapsed length feed line for a given operational requirement, that is, a given extended length.

If control valve 30 is placed in its central position both hydraulic feed lines 20 and 21 will be ported to tank. On the other hand, if the control valve is moved to its upper position, hydraulic feed line 21 is connected to high pressure and hydraulic feed line 20 is connected to tank. This simply reverses the operation of the system providing a symmetrical output and permitting the motor 33 to rotate the tool 18 in a reverse direction if desired. The operation of the system in this mode is the same as that described above, except reversed so that it need not be described in detail.

Figure 5:
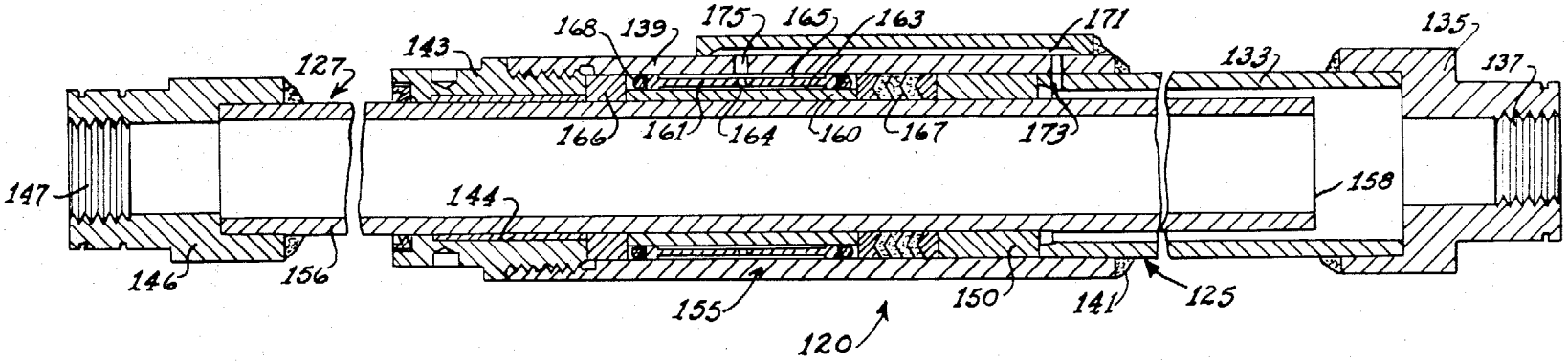
FIG. 5 is a cross sectional view of a feed line according o the second embodiment of the present invention.
Figure 4:
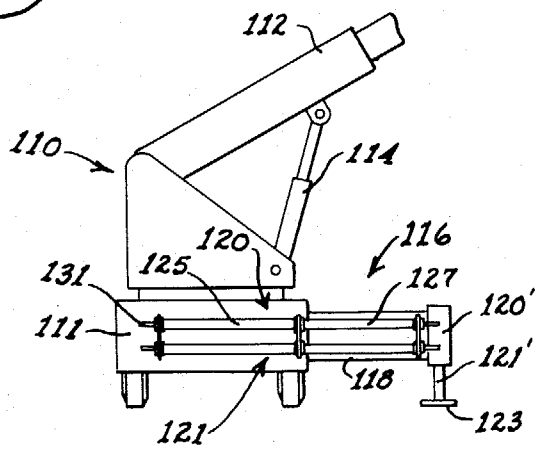
FIG. 4 is a side elevation of a mobile derrick or crane aving outrigger cylinders employing feed lines accordig to a second embodiment of the present invention.

Referring now to FIGS. 4 and 5, wherein the second embodiment of the present invention is shown, and particularly with reference to FIG. 4, a mobile derrick or crane 110 is seen to include a frame member 111 and an extendable boom 112 adapted to carry an operating implement at its distal end (broken for clarity in FIG. 4). The boom 112 is carried by the frame 111 and is adjustable with respect to the frame by means of a hydraulic cylinder 114. An outrigger assembly 116 is provided for stabilizing the crane or derrick and resisting the tilting moments thereon caused by loads imposed on the boom. The assembly 116 includes a horizontally extending beam 118 extendable and retractable with respect to the frame 111. Suitable means (not shown) are provided for clamping the beam 118 at its extended position to the frame 111. The end of the beam 118 carries a hydaulic cylinder 120' which has a piston slidable therein. The piston carries a rod 121' having a generally flat plate 123 at the end thereof defining a jack member which engages the ground to give the frame 111 the necessary support.

Telescopic feed line assemblies 120 and 121 are provided for delivering fluid from a suitable source to the opposite sides of the piston in the actuator cylinder 120'. As in the embodiment of FIGS. 1 to 3, the feed lines 120 and 121 are identical in construction so that it will be understood that a descriptive reference to one applies equally as well to the other. The feed lines 120 and 121 have an outer tube member 125 affixed with respect to the frame 111 and an inner tube member 127 slidable within the outer tube member 125 and affixed with respect to the movable outrigger beam 118. Each of the tubes 120 and 121 is adapted to either conduct fluid to or from the hydraulic actuator 120' so that the jack 123 may be positively driven either upwardly or downwardly.

The telescopic feed tubes 120 and 121 require a somewhat simplified version of the hydraulic circuit in FIG. 3. More specifically, the portion of the hydraulic circuit in FIG. 3 to the right of dotted line 130 may be hydraulically connected to the ends 131 of the outer tubes 125 as shown in FIG. 4. This portion of the hydraulic circuit operates in a manner similar to that described above with respect to FIG. 3 and suffice it to state that the control valve 30 is operable to selectively port high pressure fluid from pump 127 through either of the feed lines 120 and 121 to raise and lower the jack 123 as desired.

Referring to FIG. 5 and the construction of the telescopic feed lines 120 and 121 in more detail, the outer tube 125 is seen to include a tubular sleeve 133 having a fitting 135, suitably fixed to the end thereof as by welding. It should be understood that tube 133 is broken in FIG. 5 for the sake of illustration and that in actual practice it is of considerably longer length. Fitting 135 has threaded opening 137 which is adapted to receive a hydraulic fitting connected to the control valve 30. At the left end of the tubular sleeve 133 is a relatively short sleeve 139 which surrounds the distal periphery of tubular sleeve 133 and is welded thereto as at 141. A suitable end cap 143 is threaded within the distal end of sleeve 139 and carries a suitable bearing member 144 which slidably receives the inner tube 127.

The inner tube 127 has a suitable fitting 146 at the end thereof which is threaded as at 147 to receive a hydraulic fitting connected to one side of the hydraulic jack cylinder 120'. As with the tubular sleeve 133, the inner tube 127 is broken in FIG. 5 for clarity, but it should be understood that it too is of substantially greater length. It is sufficient to state at this point that [he] *the* inner tube 127 and the outer tube 125 are constructed so that when collapsed the inner tube 127 projects only slightly from the outer tube 125 to accommodate the fitting 146, and that for every increment of collapsed length the inner tube 127 may be extended from the outer tube a substantially equal distance. Another annular bearing member 150 is received within the sleeve 139 and abuts one of tubular sleeve 133. Bearings 144 and 150 serve to align and guide the inner tube 127 within the outer tube 125.

In the FIGS. 4 and 5 embodiment, a tube locking assembly 155 is provided for preventing any compressive or column force on the extending portion 156 of the inner tube 127. As noted generally above, the hydraulic reaction forces on the end 158 of the inner tube tend to force the inner tube from the outer tube 125. As beam 118

ı FIG. 4 is fixed to the frame 111, the inner tube is ıcapable of such movement when the outrigger assembly 16 is positioned and fixed so that this hydraulic force on ıe inner tube end 158 would, in a conventional construc-on, tend to collapse or buckle the extending portion 156 f the inner tube 127.

The tube locking assembly 155 includes a phenolic resin .eeve 160 which surrounds and closely fits the inner tube 27. The sleeve 160 is somewhat flexible so that it may e selectively clamped against the inner tube. Toward ıis end another sleeve 161 is provided surrounding the henolic resin sleeve 160 and has a reduced plurality of xial extending grooves 163 on the inner surface thereof ıat define hydraulic chambers which carry fluid to effect ıe constriction of the sleeve 160. Radial passage 164 ɔmmunicates with the chamber 163 and with a circum-ɜrentially extending chamber 165 on the outer periphery f sleeve 161.

Suitable annular seals 166 and 167 flank the ends of leeve 160 to prevent the egress of hydraulic fluid along ıe inner tube. O-ring seals 168 are seated between the leeve 160 and the outer sleeve 139 adjacent the ends of leeve 161 to prevent the escape of hydraulic fluid from hamber 165 and chamber 163.

For the purpose of providing communication between ıe chamber 165 and high pressure fluid flowing through ıe feed line, an axial extending projection [170] is fixed ɔ the outer surface of sleeve 139 and has a fluid passage 71 formed therein. Passage 171 communicates with ıe interior of the tubes 125 and 127 through a radial pas-ıge 173 extending through sleeves 139 and 133. The ther end of passage 171 communicates with chamber 165 ırough another radial port 175 in sleeve 139 adjacent ıbe lock assembly 155. The size and number of passages 73 and 175 may be varied, as desired, to achieve the ecessary clamping action. It should be noted that the uter diameter of tube 127 is less than the inner diameter f tubular sleeve 133 so that fluid may flow therebetween.

As fluid is ported to the fitting 137 from the directional alve 30, a portion of this fluid flows around the space etween the inner end of tube 127 and the tubular sleeve 33, through radial passage 173, axial passage 171, radial assage 175, into annular chamber 165, through radial orts 164, and into the chamber 163. High pressure uid in chamber 163 effects a contraction of the phenolic esin sleeve 160 so that it grips the inner tube 127. The ıbe clamp 155 is designed so that it exerts a sufficient ripping force on tube 127 to counteract the hydraulic orce acting on the end 158 of the inner tube 127 through-ut the pressure range for which the feed lines are de-igned. Thus, the compressive force on the inner tube aused by the hydroulic fluid flowing therein terminates t the tube lock 155 so that the extending portion 156 of ıe inner tube 127 is free from this compressive force or olumn action and has no tendency to buckle.

Thus, it may be seen that in both of the embodiments f FIGS. 1 to 3 and 4 and 5 applicant has provided a elescopic feed line in which the extending portion of the ınner telescopic tube is free from any column force which ı prior known devices tended to collapse and buckle ame.

[Having described my invention as related to the em-odiments shown in the accompanying drawings, it is my ıtention that the invention be not limited by any of the etails of description, unless otherwise specified, but ather be construed broadly within its spirit and scope as et out in the accompanying claims.]

I claim:

[1. A fluid system, comprising: a first member, a sec-nd member engaging said first member and being extensi-le with respect thereto, motor means associated with said econd member, a source of fluid under pressure; and feed ne means for conveying fluid from said source to said ıotor means including a first tube fixed with respect to aid first member, a second tube fixed with respect to said second member and in telescopic relation with said first tube so that upon extension of said second member the tubes will extend, means connecting said second tube to deliver fluid to said motor means, means for preventing the buckling of said tubes under pressure including means for restraining extension of the inner one of said tubes from the outer one of said tubes.]

2. A fluid system as defined in claim [1] *18*, and further including second feed line means for returning fluid from said motor to a drain including a third tube fixed with respect to said first member, a fourth tube fixed with respect to said second member and in telescopic relation with said third tube, means for conveying fluid from said motor means to said fourth tube, and means for conveying fluid from said third tube to said drain.

3. A fluid system as defined in claim 2 wherein each of said first and second feed line means is adapted to convey fluid to and from said motor to provide a reversible system, and control valve means for selectively porting fluid from said source to either of said first or second feed line means.

[4. A fluid system, comprising: a first member, a second member engaging said first member and being extensible with respect thereto, motor means associated with said second member, a source of fluid under pressure; and feed line means for conveying fluid from said source to said motor means including a first tube fixed with respect to said first member, a second inner tube fixed with respect to said second member and telescoped within said first tube, said first and second tubes being constructed so that for each increment of collapsed length of the tubes the inner tube may project a substantially equal increment from said first tube, means connecting said first tube to said source of fluid under pressure, means for connecting said second tube to deliver fluid to said motor means, means for preventing the buckling of said tubes under pressure including means for restraining extension of the inner one of said tubes from the outer one of said tubes when the first member is stationary with respect to the second member, said means for preventing buckling of said inner tube being effective in substantially all extended positions of said first and second tubes.]

[5. A fluid system for supplying fluid to a remote load, comprising: a first member, a second member engaging said first member and being extensible with respect thereto, motor means carried by said second member, a source of fluid under pressure; and feed line means for conveying fluid from said source to said motor means including a first tube fixed with respect to said first member, a second tube fixed with respect to said second member and in telescopic relation with said first tube so that upon extension of said second member the tubes will extend, one of said tubes being the inner tube and slideable within the other of said tubes, piston means on the end of said inner tube, said piston having a greater diameter than said inner tube so that it defines a fluid chamber between the inner and outer tubes, and passage means in said first tube for conveying fluid under pressure to said chamber to provide a force tending to collapse said tubes, said first and second members being selectively adjustable so that collapsing of said tubes is prevented.]

[6. A fluid system for supplying fluid to a remote load, comprising: a first member, a second member engaging said first member and being extensible with respect thereto, motor means carried by said second member, a source of fluid under pressure; and feed line means for conveying fluid from said source to said motor means including a first tube fixed with respect to said first member, a second tube fixed with respect to said second member and in telescopic relation with said first tube so that upon extension of said second member the tubes will extend, one of said tubes being the inner tube and slideable within the other of said tubes, piston means on the end of said inner tube, said piston having a greater diameter than said inner tube so that it defines a fluid chamber between the inner and outer tubes, said piston also defining a second chamber on the other side thereof in the outer first tube, passage means in said first outer tube for conveying fluid under pressure to said first chamber to provide a continuous collapsing force on said tubes, and means connecting said second chamber to drain to prevent a hydraulic extending force on said tubes, said tubes being in constant communication so that fluid flows from said first tube to said second tube and to said motor means while said first member moves with respect to said second member and while said first member is fixed with respect to said second member.]

[7. A fluid system as defined in claim 6 and further including second feed line means for returning fluid from said motor to a drain.]

[8. A fluid system as defined in claim 7 wherein said second feed line means includes a third outer tube fixed with respect to said first member, a fourth inner tube fixed with respect to said second member and telescoped within said third tube, said fourth tube having a piston on the end thereof slideable within said third tube, said second piston being of greater diameter than said fourth tube to define a third chamber in said third tube, second passage means in said third tube for conveying fluid to said third chamber, said second piston defining a fourth chamber on the other side thereof within said third tube; and means for selectively connecting each of said first and second feed line means to said source of fluid under pressure or to a drain including a control valve connected to selectively deliver fluid from said source to said first chamber and from said third chamber or to said third chamber and from said first chamber, and means for communicating each of said second and fourth chambers continuously with said drain.]

9. A fluid system *for supplying fluid to a remote load, comprising: a first member, a second member engaging said first member and being extensible with respect thereto, motor means carried by said second member, a source of fluid under pressure; and feed line means for conveying fluid from said source to said motor means including a first tube fixed with respect to said first member, a second tube fixed with respect to said second member and in telescopic relation with said first tube so that upon extension of said second member the tubes will extend, one of said tubes being the inner tube and slideable within the other of said tubes, piston means on the end of said inner tube, said piston having a greater diameter than said inner tube so that it defines a fluid chamber between the inner and outer tubes, said piston also defining a second chamber on the other side thereof in the outer first tube, passage means in said first outer tube for conveying fluid under pressure to said first chamber to provide a continuous collapsing force on said tubes, means connecting said second chamber to drain to prevent a hydraulic extending force on said tubes, said tubes being in constant communication so that fluid flows from said first tube to said second tube and to said motor means while said first member moves with respect to said second member and while said first member is fixed with respect to said second member, including second feed line means for returning fluid from said motor to a drain, said second feed line means including a third outer tube fixed with respect to said first member, a fourth inner tube fixed with respect to said second member and telescoped within said third tube, said fourth tube having a piston on the end thereof slideable within said third tube, said second piston being of greater diameter than said fourth tube to define a third chamber in said third tube, second passage means in said third tube for conveying fluid to said third chamber, said second piston defining a fourth chamber on the other side thereof within said third tube; means for selectively connecting each of said first and second feed line means to said source of fluid under pressure or to a drain including a control valve connected to selectively deliver fluid from said source to said first chamber and from said third chamber or to said third chamber and from said first chamber, means for communicating each of said second and fourth chambers continuously with said drain,* [as defined in claim 8 wherein] said means for communicating each of said second and fourth chambers with said drain [includes] *including* means connecting said second and fourth chambers together in fluid communication, and normally open poppet valves in each of said first and third outer tubes, said poppet valves being responsive to high pressure in said first and second passages to close selectively, preventing flow of high pressure fluid to said second and fourth chambers.

10. A fluid system *for supplying fluid to a remote load, comprising: a first member, a second member engaging said first member and being extensible with respect thereto, motor means carried by said second member, a source of fluid under pressure; and feed line means for conveying fluid from said source to said motor means including a first tube fixed with respect to said first member, a second tube fixed with respect to said second member and in telescopic relation with said first tube so that upon extension of said second member the tubes will extend, one of said tubes being the inner tube and slideably within the other of said tubes, piston means on the end of said inner tube, said piston having a greater diameter than said inner tube so that it defines a fluid chamber between the inner and outer tubes, said piston also defining a second chamber on the other side thereof in the outer first tube, passage means in said first outer tube for conveying fluid under pressure to said first chamber to provide a continuous collapsing force on said tubes, means connecting said second chamber to drain to prevent a hydraulic extending force on said tubes, said tubes being in constant communication so that fluid flows from said first tube to said second tube and to said motor means while said first member moves with respect to said second member and while said first member is fixed with respect to said second member,* [as defined in claim 6 wherein] said first outer tube [includes] *including* an outer sleeve, an inner sleeve spaced from the outer sleeve and defining therein a portion of said passage means, a fitting at one end of said first tube adapted to be connected to said fluid pressure source, said fitting communicating with the space between the outer and inner sleeves, port means in the distal end of said inner sleeve for conducting fluid from said space to said first chamber, and port means in said inner tube for conducting fluid from said first chamber to said inner tube and to the motor means.

[11. A fluid system as defined in claim 6 wherein said first and second members are an extendable boom, and a fluid operated tool on the end of said boom driven by said motor means.]

[12. A fluid system for supplying fluid to a remote load, comprising: a first member, a second member engaging said first member and being extensible with respect thereto, motor means carried by said second member, a source of fluid under pressure; and feed line means for conveying fluid from said source to said motor means including a first tube fixed with respect to said first member, a second tube fixed with respect to said second member and in telescopic relation with said first tube so that upon extension of said second member the tubes will extend, one of said tubes being the inner tube and slideable within the other outer tube, a flexible sleeve member in said outer tube surrounding said inner tube, a fluid chamber in said outer tube around a portion of said sleeve, and passage means in said outer tube communicating said source of fluid under pressure with said chamber so that the sleeve selectively clamps the outer tube to the inner tube thereby preventing extension of the inner tube therefrom.]

[13. A fluid system for supplying fluid to a remote load comprising: a first member, a second member engaging said first member and being extensible with respect thereto, motor means carried by said second member, a source f fluid under pressure; and feed line means for conveyig fluid from said source to said motor means including first tube fixed with respect to said first member, a econd tube fixed with respect to said second member and n telescopic relation with said first tube so that upon exension of said second member the tubes will extend, said econd tube being the inner tube and slideable within ne first tube, spaced seals defining a chamber within the istal end of said first outer tube and engaging said inner ube, a flexible sleeve in said chamber between said seals dapted to selectively clamp against said inner tube *and revent extension of the inner tubes,* generally radial pasage means in said outer tube extending from said chamer, axial extending passage means connected with said adially extending passage means, second radial passage neans in said first tube communicating with said axial assage and with the interior of said first tube, said first nd second tubes being spaced adajcent said second radial assage means so that said latter passage cimmunicates vith high pressure fluid flowing through said tubes.]

[14. A fluid system as defined in claim 13 and further ncluding second feed line means for conveying fluid from aid motor to a drain.]

[15. A fluid system as defined in claim 14 wherein said rst and second feed line means are disposed in generally arallel fashion; and control valve means for selectively orting fluid under pressure to one of said feed line means nd the other of said feed line means to drain whereby he system is reversible.]

[16. A fluid system as defined in claim 15 wherein said rst and second extensible members are an adjustable outigger for balancing a mobile mechanism, a vertically novable support driven by said motor means and adustable to engage the ground to balnace the mobile nechanism.]

*17. A fluid system, comprising: a first member, a secnd member extensible relative to said first member, notor means associated with said second member, fluid eed line means for conveying fluid under pressure to said notor means including first tube means fixed with respect o said first member, second tube means in telescopic relaion with said first tube means, means connecting said econd tube means to deliver fluid to said motor means, nd means for preventing the buckling of the inner one f said tube means under pressure including piston means n the inner one of said tube means, said first and second ube means defining a flow passage for the main body of luid flow from one of said tube means to the other of aid tube means, said flow passage directing the main ody of flow toward said piston means and then away herefrom in the same direction to pressurize only one side f said piston means.*

*18. A fluid system, comprising: a first member, a secnd member extensible relative to said first member, a notor associated with said second member, fluid feed line neans for conveying fluid under pressure to said motor ncluding a first tube fixed with respect to said first memer, a second tube in telescopic relation with said first ube, means connecting said second tube to deliver fluid elative to said motor means, means opposing the extenion of said second tube relative to said first tube including impervious piston means substantially at the inner end of the inner one of said tube means, and means for depressurizing the side of said piston means which when pressurized tends to extend said second tube means from said first tube means.*

*19. A fluid system, comprising: a first member, a second member extensible relative to said first member, motor means associated with said second member, fluid feed line means for conveying fluid under pressure to said motor means including first tube means fixed with respect to said first member, second tube means in telescopic relation with said first tube, means connecting said second tube to deliver fluid relative to said motor means, piston means on the inner one of said tube means, means for pressurizing the side of the piston means tending to retract the inner tube means with respect to the outer tube means, said piston means being substantially at the inner end of said inner one of said tube means, and means for directing fluid flow toward and away in the same direction from the end of said tube means which when pressurized tends to extend said second tube means relative to said first tube means.*

*20. A fluid system, comprising: a first member, a second member extensible relative to said first member, motor means associated with said second member, fluid feed line means for conveying fluid under pressure to said motor means including first tube means fixed with respect to said first member, second tube means in telescopic relation with said first tube, means connecting said second tube means to deliver fluid relative to said motor means, piston means on the inner one of said tube means, means for pressurizing the side of the piston means tending to retract the inner tube means with respect to the outer tube means, at least one of said tube means having passage means not passing through said piston means for conveying the main flow from one tube means to the other tube means without pressurizing the side of the piston means tending to extend one tube means from the other tube means.*

References Cited

The following references, cited by the Examiner, are of record in the patented file of this patent or the original patent.

UNITED STATES PATENTS

| | | | |
|---|---|---|---|
| 915,502 | 3/1909 | Struer | 285—302 |
| 995,792 | 6/1911 | Koenig | 285—302 |
| 1,360,382 | 11/1920 | Edwards | 285—302 |
| 1,513,315 | 10/1924 | Cook | 285—302 |
| 1,575,185 | 3/1926 | Stenhouse | 92—61 X |
| 1,914,741 | 6/1933 | Gysling | 285—302 X |
| 2,323,179 | 6/1943 | Hall et al. | 285—302 X |
| 2,373,280 | 4/1945 | Weber | 285—302 |
| 2,402,157 | 6/1946 | Griswold | 285—302 X |

MARTIN P. SCHWADRON, Primary Examiner

I. C. COHEN, Assistant Examiner

U.S. Cl. X.R.

91—411; 92—61, 110, 146; 138—111; 285—302